United States Patent [19]

Panchenkov et al.

[11] 4,001,587
[45] Jan. 4, 1977

[54] COLOR INDICATOR-DOSIMETER OF IONIZING RADIATION

[76] Inventors: Georgy Mitrofanovich Panchenkov, Leninsky prospekt, 67, kv. 133; Leonid Leonidovich Kozlov, Stoleshnikov pereulok, 9, kv. 18; Alexandr Alexandrovich Molin, ulitsa Molodezhnaya, 3, kv. 482; Zinaida Fedorovna Ershova, ulitsa Vavilova, 52, korpus 4, kv. 289; Lev Mikhailovich Mikhailov, ulitsa Raspletina, 17, korpus 2, kv. 49; Albert Genrikhovich Juzvyak, Teply stan, 2 miktroraion, korpus 27, kv. 252, all of Moscow; Rail Bakirovich Valitov, ulitsa Bljukhera, 18, kv. 7, Ufa; Vyacheslaw Petrovich Churov, ulitsa Zheleznodorozhnaya, 14, kv. 9, Stterlitamak; Mikhail Petrovich Grinev, Leningradsky prospekt, 71, kv. 61, Moscow, all of U.S.S.R.

[22] Filed: Oct. 24, 1975

[21] Appl. No.: 625,513

[52] U.S. Cl. .................... 250/474; 250/461 R; 250/486
[51] Int. Cl.² .................................... G01N 5/00
[58] Field of Search ....................... 250/474

[56] References Cited
UNITED STATES PATENTS 3,226,233  12/1965  Agruss ................. 250/474
3,290,499  12/1966  Vale .................... 250/474
3,743,846   7/1973  Matsumoto et al. ..... 250/474
3,899,677   8/1975  Hori et al. ............ 250/474

*Primary Examiner*—Harold A. Dixon

[57] ABSTRACT

The color indicator-dosimeter of ionizing radiation in accordance with the invention comprises 70 to 100 parts by weight of a thermoplastic polymer, 10 to 40 parts by weight of a plasticizer, 0.5 to 3.0 parts by weight of a stabilizer and two dyes compatible with said polymer. One of said dyes is incorporated in the color indicator-dosimeter to the extent of from 0.007 to 0.01 part by weight; its G value of decolorization in the polymer is 0.05 to 0.1 molecule/100 eV and its absorption maximum lies in the 450 to 590 nm spectral range. The other of said two dyes is incorporated in the color indicator-dosimeter to the extent of from 0.015 to 0.03 part by weight; its G value of decolorization in the polymer is 0.15 to 1.5 molecule/100 eV and its absorption maximum lies in the 600 to 720 nm spectral range.

The proposed color indicator-dosimeter of ionizing radiation permits measuring dose rates in the range from $0.5 \times 10^6$ to $3.5 \times 10^7$ rad to within ± 25 to 30 percent visually and to within ±15 to 20 percent objectively. The proposed color indicator-dosimeter of ionizing radiation is not responsive to light; its color does not change after irradiation for at least 12 months.

3 Claims, No Drawings

COLOR INDICATOR-DOSIMETER OF IONIZING RADIATION

The present invention relates to color indicators-dosimeters of ionizing radiation.

Said indicators-dosimeters of ionizing radiation are widely employed for determining and monitoring the dosage of ionizing radiation (gamma rays, X-rays and high energy electrons) in a broad range of dose rates.

There exist a range of color indicators-dosimeters of ionizing radiation incorporating an acid-sensitive dye responsive to ionizing radiation, which change their color on exposure to such radiation.

Thus, for instance, it is known in the art to employ a color indicator of ionizing radiation which comprises a film deposited on paper from an aqueous dispersion of polyvinyl chloride or its copolymer with an acrylic ester, the aqueous phase of the dispersion having incorporated therein an acid-sensitive dye such as Dimethyl Yellow. It is protected against the action of light by a special protective coating. Such an indicator changes its color from yellow to red when the film is exposed to an ionizing radiation dose of $1.5 \times 10^6$ rad. It is likewise known in the art to employ an indicator of ionizing radiation formed as a polyvinyl alcohol film containing non-volatile halogen-containing hydrocarbons, a buffer depart for maintaining a desired pH value of the film and an acid-sensitive dye such as Methyl Orange. This indicator changes its color from yellow to red when the film is exposed to an ionizing radiation dose of from $0.5 \times 10^6$ to $2.5 \times 10^6$ rad. Another indicator-dosimeter comprising a paraffin, a non-volatile halogen-containing hydrocarbon and an acid-sensitive dye such as Methyl Orange, is employed by biologists to determine the distribution of microdoses on the order of $10^3$ to $10^5$ rad. The latter type of indicator also changes color from yellow to red upon exposure to radiation. The indicator is manufactured in the form of blocks and moldings.

The disadvantages of the foregoing indicators-dosimeters stem directly from the use of an acid-sensitive dye as the element responsive to ionizing radiation. Dyes of this sort are pH indicators, changing their color while reacting with the acid which is formed as the radiation affects the halogen-containing polymer composition.

Thus, indicators of this type can only be useful in determining the presence of radiation, but not in quantifying it.

These indicators have a low response to radiation. As a rule, the color change from yellow to red does not enable the intermediate doses from 0 to the color transition dose to be determined.

The indicators have poor light resistance both in the initial state and as-irradiated, the reason for which should be sought in the fact that prolonged exposure to light, just exposure to ionizing radiation, gives rise to an acid in the polymer base which, as pointed out earlier, reacts with the acid-sensitive dye. For this reason, expensive protective coatings must be employed, if the initial color of the dye is to be protected and the required period of retention of irradiation information is to be attained.

It is further known in the art to employ color indicators-dosimeters such as "Megarai" which comprise a halogen-containing polymer, e.g. a copolymer of vinyl and vinylidene chlorides, a plasticizer and an acid-sensitive dye. The latter consists of two components: (a) an acid-sensitive dye, e.g. Dimethyl Yellow, insoluble in water and soluble in the plasticizer or some other organic solvent, and (b) an acid-sensitive dye soluble in water, the latter dye, in its turn, being composed of one or several components. If several, e.g. two, components are used, the color of one of them must coincide with the color of the whole acid-sensitive dye in the non-irradiated indicator-dosimeter, while the other component must be different in color. The total quantity of the dye ranges from 0.5 to 5 percent by weight of the indicator. At a dose of $5 \times 10^6$ rad, the initial green color of the coating changes to brown directly, by-passing any intermediate shade. This indicator likewise uses a protective coating.

The water-soluble dye component indeed increases its sensitivity to the dose, but still quantitative evaluation of the extent of radiation with the aid of this indicator is subject to considerable difficulty. The foregoing mixture of dyes employed as the radiation sensitive component can only be used in conjunction with halogen-containing polymers. The problem of light protection and preservation of the color information likewise remains outstanding, as evidenced by the need for a protective coating. Yet even the protective coating is found wanting, for, as demonstrated by tests, the original color of the indicator film shifts toward brown after prolonged exposure to light (1 to 2 months).

It is also known in the art to employ an indicator-dosimeter which comes closest to the indicator of the present invention. The former comprises a film of polyvinyl chloride or copolymers of vinyl chloride with vinyl acetate or propylene, which contains a plasticizer, e.g. dilaurate of dibutyltin, a filler, e.g. liquid paraffin, a promotor such as epoxidated soybean oil, a stabilizer such as zinc and cadmium stearates or tin maleates, and an acid-sensitive dye, e.g. p-dimethylaminoazobenzene, Methyl Yellow or a mixture of said dyes with an aniline dye, the dyes accounting for not more than 3 percent by weight of the indicator. Also patented has been a method for producing this indicator-dosimeter which comprises manufacturing the indicator film by hot rolling of the mixture at a temperature of from 150° to 155° C. The film is given a protective coating. The original color of the film is yellow which changes to red at radiation doses in excess of $1.5 \times 10^6$ rad. The effective dose range of the indicator is from $4.5 \times 10^5$ to $10^7$ rad.

Indicators of the latter type, however, exhibit all the disadvantages of the earlier described indicators incorporating an acid-sensitive dye. The accuracy of evaluation of the absorbed dose is low; in fact, all the indicator evidences is whether or not the object has been exposed to radiation. The poor color stability of the indicators, both prior to and after irradiation, is prohibitive to prolonged storage of information about the radiation. The dyes employed are acid-sensitive ones which must be highly purified to be fit for use in the indicators. The range of available dyes is very limited, limiting the capability of the color indicators on their basis as far as the range of absorbed doses is concerned.

It is an object of the present invention to provide a color indicator-dosimeter of ionizing radiation which would exhibit improved sensitivity to radiation, improved accuracy of irradiation measurements and increased photostability both prior to irradiation and as irradiated.

These and other objects are attained by the provision of a color indicator-dosimeter of ionizing radiation, which comprises from 70 to 100 parts by weight of a thermoplastic polymer, from 10 to 40 parts by weight of a plasticizer, from 0.5 to 3.0 parts by weight of a stabilizer and two dyes compatible with the said polymer. In accordance with the invention, one of said dyes is incorporated in the color indicator-dosimeter to the extent of from 0.007 to 0.01 part by weight and has a G value of decolorization in the polymer of from 0.05 to 0.1 molecule/100 eV, with the absorption maximum thereof lying in the 450 to 590 nm spectral range, whereas the other of said two dyes is incorporated in the color indicator-dosimeter to the extent of from 0.015 to 0.03 part by weight and has a G value of decolorization in the polymer of from 0.15 to 1.5 molecule/100 eV the absorption maximum thereof lying in the 600 to 720 nm spectral range.

The polymeric ingredient of the proposed indicator-dosimeter may be any of the thermoplastic polymers of the polyvinyl type comprising halogen atoms, such as polyvinyl chloride, copolymers of vinyl chloride with propylene, vinyl acetate, methylmetacrylate, vinylidene chloride (saran); containing no halogen atoms, e.g. polystyrene; as well as polymers of the polyester type, e.g. various cellulose esters such as cellulose triacetate, Cellon, etc.

While the mixture of components is being processed, plasticizing and stabilizing agents must be added thereto for well known purposes. The plasticizer for the above-listed polymer bases may be dibutylphthalate, dioctylphthalate or diamylphthalate. The thermostabilizers, which in some cases additionally serve as lubricants, may be salts of stearic or maleic acids. In the case in question, calcium stearate was employed.

The indicator-dosimeter of the invention may include dyes belonging to a variety of groups by their chemical structure. Here is the list of suitable groups of dyes differing in spectral response and in the G values of decolorization in the above-listed polymers, in accordance with the earlier described principle of selection determined by these authors.

Dyes having a G valve of decolorization of from 0.15 to 1.5 molecule/100, eV with the absorption maximum lying in the 600 to 720 nm spectral range:

1. Triarylmethane dyes, e.g. Basic Green 4 (Malachite Green):

2. Indigoid dyes, e.g. indigocarmine:

3. Indophenol dyes, e.g. Thilmance dye:

4. Indamine dyes, e.g. Bindschedler Green:

-continued

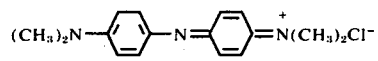

5. Indaniline dyes, e.g. Naphthol Blue:

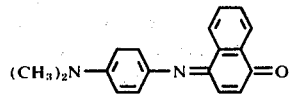

6. Thiazine dyes, e.g. Methylene Blue:

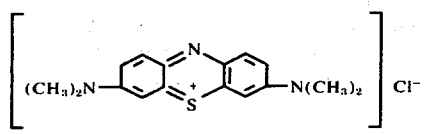

Dyes with a G value of decolorization of from 0.05 to 0.1 molecule/100 eV and the absorption maxima in the 450 to 590 nm spectral range:

1. Xanthene dyes, e.g. Rhodamine C:

2. Polymethine dyes, e.g. Red Astrazone 6 G:

3. Pyrazolone dyes, e.g. Acid Yellow Photostable:

The proposed color indicator-dosimeter of ionizing radiation is a polymer film incorporating two dyes whose absorption maxima lie in the above-indicated regions of the visible spectrum, which belong to different groups by their chemical structure and which differ by their G values of decolorization in the polymeric matrice of the indicator-dosimeter to the extent indicated hereabove.

The G value of decolorization is calculated by formula 1:

$$G\ \text{decol.} = 0.965 \times 10^8\ \Delta S/E\text{ldD}, \qquad (1)$$

where
G. decol. is the radio-chemical yield of decolorization of the dye (molecules per 100 eV);

ΔS is the variation in the optical density of the film measured at a wavelength corresponding to the absorption maximum of a given dye in the film;

E is the decimal molar extinction coefficient of the dye (mole$^{-1}$ × cm$^{-1}$);

$d$ is the density of the film material (g/cu.cm);

$l$ is the thickness of the colored film (cm); and $D$ is the absorbed dose (rad).

Introducing into said polymers a mixture of dyes, e.g. a mixture of triphenylmethane and xanthene dyes, we obtain a colored system, wherein ionizing radiation induces processes of decolorization of the dyes proceeding at different rates. The less stable triphenylmethane dyes having a large G value of decolorization are decolorized at a faster rate than do the xanthene dyes, producing a color change in the film exposed to radiation corresponding to a specific absorbed dose.

Thus, for instance, if use is made of Malachite Green and Rhodamine C, the former is decolorized faster and, at a certain dose rate, fades entirely, whereas at the same dose rate Rhodamine C is not totally decolorized, giving rise to a color change from blue or violet to red or orange. The intermediate hues permit visually determining the dose rate from $0.5 \times 10^6$ rad to that causing the Malachite Green component to fade, the error of dose determination not exceeding 25 percent. The absorbed dose may likewise be determined objectively by the variation in the optical density of the film at a wavelength $\lambda == 630$ nm, i.e. the absorption maximum of Malachite Green, and/or by the optical density of the film at the Rhodamine C absorption maximum $\lambda = 560$ nm with an error of not more than ±10 to 15 percent depending on the concentration of the dyes. The overall dose range measurable by this system stretches from $0.5 \times 10^6$ to $3.5 \times 10^7$ rad.

The original color of the film may be green, as is the case for the pair Methyl Green (a triphenylmethane dye) plus Acid Yellow Photostable (a pyrazolone dye). Then, at a dose rate of e.g. $10^7$ rad, the film turns yellow.

The proposed indicator-dosimeter is capable of measuring radiation doses in the range from $0.5 \times 10^6$ to $3.5 \times 10^7$ rad, which is achieved, as in the examples that follow, by changing the composition of the polymer matrice as well as the quantity and type of the dye being employed. Besides, when the proposed indicator-dosimeter is manufactured on a commercial scale, use can be made of the components of mixtures prepared in the manufacture of common polymer films (plasticizers and stabilizers), so that any industrial facilities (rollers, calanders, presses) employed in the production of common polymer films can be readily adjusted for the production of the proposed indicator-dosimeter. Commercial manufacture of the proposed color indicators-dosimeters may thus be realized at any plant producing polymer films, requiring no specialty equipment.

The present indicator-dosimeter incorporates no acidsensitive dyes, so that all the materials that go into it may be of industrial purity grade.

The proposed indicator-dosimeter enables radiation doses to be visually (by color) and objectively (with the aid of a spectrophotometer) determined in the following dose ranges:

visually, from $0.5 \times 10^6$ to $3.5 \times 10^7$ rad to within ± 25 to 30 percent;

objectively, from $0.5 \times 10^6$ to $3.5 \times 10^7$ rad to within ± 15 to 20 percent.

The original principle of selection of the dye components makes the proposed indicator-dosimeter nonsensitive to light. For the same reason its color is stable with time after irradiation for at least 12 months, permitting extended storage of radiation information. No protective coating is consequently required.

The contrast color change (from blue to red) afforded by the proposed indicator-dosimeter enables the radiation dose to be determined under any irradiation conditions.

The cost of production of the proposed color indicator-dosimeter is only slightly higher than the cost of manufacture of common polymer films from the matrices indicated hereabove (see the examples).

The particular process of conversion of the starting mixture of components to the film of the indicator-dosimeter depends on the type of polymer matrice. Thus, if the matrice is polyvinyl chloride, copolymers of vinyl chloride with propylene, vinyl acetate or vinylidene chloride, the process for the production of the proposed color indicators-dosimeters comprises rolling or calendering a mixture of the commercial polymer powder, aqueous or water-alcohol solutions of dyes, a plasticizer (dioctylphthalate, dibutylphthalate or dialkylphthalate) and a stabilizer which is to protect the polymer against thermal destruction (calcium stearate), the process being effected at a temperature in the range from 145° to 150° C. The resultant film has a thickness of 300 to 500 microns.

Should the polymer matrice be composed of the copolymer of vinyl chloride with methylmetacrylate, the mixture may be converted to film by pressing at elevated temperature (150° C.) and at a pressure in excess of 50 kg/sq.cm.

Should the polymer matrice of the indicator-dosimeter be constituted by polystyrene, the mixture components may be converted to film by extrusion or molding from a solution of the components in an organic solvent using a commonly known procedure. In this case the dyes are added to the mixture in the form of solutions in an appropriate organic solvent whose type depends on the type of dye selected.

Besides, the dyes may be introduced into the film of a polyester-type polymer from a solution in an organic solvent or a mixture thereof with water (acetone-water in the ratio 70 acetone to 30 water), as is the case with cellulose triacetate where use is made of a commercial grade of film containing a plasticizer and a stabilizer; or else colored film may be obtained by molding from solutions of the components in methylene chloride in a commonly accepted process.

To fasten the film to the object to be irradiated, a layer of long-drying adhesive may be applied to one of its sides. The film color is stable with time. In order to increase the reflecting background, inert mat agents, e.g. titanium oxide, may be added to the mixture being converted to film.

The proposed color indicators-dosimeters may be employed for monitoring the absorbed doses in a number of processes involving radiation modification of polymetric materials (polyethylene cross-linking grafting of monomers) as well as in radiation sterilization of medical items and in pasteurization of food stuffs. Finally, the colored film produced in accordance with the invention may find application as a decorative material.

The invention will be further understood from the following exemplary embodiments thereof.

EXAMPLE 1

Polyvinyl chloride (suspension) — 100 parts by weight
Dioctylphthalate — 40 parts by weight
Calcium stearate — 3 parts by weight
Aqueous solution of Malachite Green (concentration 0.1%), a triphenylmethane dye — 30 parts by weight of 0.03 part by weight of dry dye
Aqueous solution of Rhodamine C (concentration 0.5%), a Xanthene dye — 2 parts by weight or 0.01 part by weight of dry dye.

The mixture is converted to film by rolling or calendering at a temperature of from 140° to 150° C.

The product film is blue, changing to violet at a radiation dose of $10^7$ rad, to red at a radiation dose of $1.5 \times 10^7$, and to orange at a radiation dose of $2 \times 10^7$ rad.

EXAMPLE 2

Polyvinyl chloride (suspension) — 70 parts by weight
Dioctylphthalate — 10 parts by weight
Calcium stearate — 0.5 part by weight
Aqueous solution of Malachite Green (concentration 0.1%), a triphenylmethane dye — 15 parts by weight or 0.015 part by weight of dry dye
Aqueous solution of Rhodamine C (concentration 0.5%), a xanthene dye — 1.5 parts by weight or 0.007 part by weight of dry dye.

The mixture is converted to film in a procedure duplicating that of Example 1.

Originally the film is blue, turning violet at a radiation dose of $0.5 \times 10^6$ rad, red-violet at a radiation dose of $2.0 \times 10^6$, red at a radiation dose of $2.5 \times 10^6$ rad, and orange at a radiation dose of $10^7$ rad.

In the examples with polyvinyl chloride, the concentrations of the components are extreme ones; their optimal concentration depends on the designation of the color indicator-dosimeter.

EXAMPLE 3

Copolymer of vinyl chloride with propylene (in the polymerization weight ratio of 70 vinyl chloride to 30 propylene), molecular weight, 100,000 — 100 parts by weight
Dioctylphthalate — 40 parts by weight
Calcium stearate — 0.5 part by weight
Aqueous solution of Malachite Green (concentration 0.1%), a triphenylmethane dye, — 20 parts by weight or 0.02 part by weight of dry dye
Aqueous solution of Rhodamine C (concentration 0.5%), a xanthene dye — 2 parts by weight or 0.01 part by weight of dry dye.

The mixture is converted to film in a procedure duplicating that of Example 1.

The non-irradiated film is blue, turning red-violet at a radiation dose of $5 \times 10^6$ rad, and red at a radiation dose of $1.5 \times 10^7$ rad.

EXAMPLE 4

Copolymer of vinyl chloride with vinyl acetate (in the copolymerization weight ratio of 90 vinyl chloride to 10 vinyl acetate), molecular weight roughly 90,000 — 100 parts by weight
Dioctylphthalate — 10 parts by weight
Calcium stearate — 0.5 part by weight
Aqueous solution of Malachite Green (concentration 0.1%), a triphenylmethane dye — 15 parts by weight or 0.015 part by weight of dry dye
Aqueous solution of Rhodamine C (concentration 0.5%), a xanthene dye — 1.5 parts by weight or 0.007 part by weight of dry dye.

The mixture is converted to film in a procedure duplicating that of Example 1.

The non-irradiated film is blue, turning violet at a radiation dose of $0.5 \times 10^6$, red-violet at a radiation dose of $2.5 \times \times 10^6$, red at a radiation dose of $5 \times 10^6$ rad, and orange at a radiation dose of $10^7$ rad.

EXAMPLE 5

Copolymer of vinyl chloride with vinylidene chloride (saran) - 100 parts by weight
Dialkylphthalate — 10 parts by weight
Calcium stearate — 1 part by weight
Aqueous solution of Methylene Blue (concentration 0.5%), a thiazine dye - 2 parts by weight or 0.01 part by weight of dry dye
Aqueous solution of Rhodamine C (concentration 0.5%), a xanthene dye - 2 parts by weight of 0.01 part by weight of dry dye.

The mixture is converted to film in a procedure duplicating that of Example 1.

The non-irradiated film has a dull blue color, turning violet at a radiation dose of $5.0 \times 10^6$ rad, and red at a radiation dose of $1.5 \times 10^7$ rad.

EXAMPLE 6

Copolymer of vinyl chloride with methylmetacrylate (in the polymerization weight ratio of 95 vinyl chloride to 5 methylmetacrylate), molecular weight roughly 80,000 — 100 parts by weight
Dibutylphthalate — 15 parts by weight
Water-alcohol solution of Methyl Green (in the volume ratio of 50 water to 50 alcohol, concentration 0.1%), a triphenylmethane dye — 20 parts by weight or 0.02 part by weight of dry dye
Water-alcohol solution of Acid Yellow Photostable (in the volume ratio of 50 water to 50 alcohol, concentration, 0.2%), a pyrazolone dye — 5 parts by weight or 0.01 part by weight of dry dye.

The film is produced by pressing the mixture at a temperature of 150° C. and a pressure in excess of 150 kg/sq.cm.

The non-irradiated film is blue-green, turning green at a radiation dose of $1 \times 10^6$ rad, yellow-green at a radiation dose of $5 \times 10^6$ rad, and yellow at a radiation dose of $10^7$ rad.

EXAMPLE 7

Polyvinyl chloride (suspension) — 70 parts by weight
Calcium stearate — part by weight 1
Dioctylphthalate — 20 parts by weight
Aqueous solution of Methylene Blue (concentration 0.5%), a thiazine dye — 2 parts by weight or 0.01 part by weight of dry dye
Aqueous solution of Rhodamine C (concentration 0.5%), a xanthene dye — 2 parts by weight or 0.01 part by weight of dry dye.

The mixture is converted to film in a procedure duplicating that of Example 1.

The non-irradiated film is blue, turning violet at a radiation dose of $2 \times 10^6$ rad, remaining violet at a radiation dose of $5 \times 10^6$ rad, becoming pink-violet at a radiation dose of $1.5 \times 10^7$ rad, and pink at a radiation dose of $2.5 \times 10^7$.

EXAMPLE 8

Polyvinyl chloride (suspension) — 100 parts by weight
Dioctylphthalate — 25 parts by weight
Calcium stearate — 0.5 part by weight
Water-alcohol solution of indigocarmine (in the volume ratio of 50 water to 50 alcohol, concentration 0.2%) — 10 parts by weight or 0.02 part by weight of dry dye
Aqueous solution of Rhodamine C (concentration 0.5%), a xanthene dye — 2 parts of weight or 0.01 part by weight of dry dye.

The mixture is converted to film in a procedure duplicating that of Example 1.

The non-irradiated film is blue-violet, turning violet at a radiation dose of $10^7$ rad, red-violet at a radiation dose of $2.5 \times 10^7$, and red at a radiation dose of $3 \times 10^7$.

EXAMPLE 9

Polyvinyl chloride (suspension) — 100 parts by weight
Dialkylphthalate — 40 parts by weight
Calcium stearate — 3 parts by weight
Water-alcohol solution of Bindschendler's Green (in the volume ratio of 50 water to 50 alcohol, concentration 0.1%), an indamine dye — 30 parts by weight or 0.03 part by weight of dry dye
Water-alcohol solution of Red Astrazone 66 (in the volume ratio of 50 water to 50 alcohol, concentration 0.1%), a polymethine dye — 10 parts by weight or 0.01 part by weight of dry dye.

The mixture is converted to film in a procedure duplicating that of Example 1.

The non-irradiated film is bright blue-violet, turning red-violet at a radiation dose of 5 Mrad, and red at a radiation dose of 10 Mrad.

EXAMPLE 10

Copolymer of vinyl chloride with vinyl acetate (in the weight ratio of 90 vinyl chloride to 10 vinyl acetate), molecular weight 90,000 — 100 parts by weight
Dioctylphthalate — 20 parts by weight
Calcium stearate — 0.5 part by weight
Aqueous solution of Naphthol Blue (concentration 0.3%), an indaniline dye — 10 parts by weight or 0.03 part by weight of dry dye
Aqueous solution of Rhodamine C (concentration 0.5%), a xanthene dye — 1.5 part by weight or 0.007 part by weight of dry dye.

The mixture is converted to film in a procedure duplicating that of Example 6.

The non-irradiated film is blue, turning violet at a radiation dose of $2 \times 10^6$ rad, red-violet at a radiation dose of $5 \times 10^6$ rad, and red at a radiation dose of $7.5 \times 10^6$ rad.

EXAMPLE 11

Polystyrene (suspension) — 100 parts by weight
Dioctylphthalate — 10 parts by weight
Calcium stearate — 0.5 part by weight
Solution of Malachite Green in cyclohexane (concentration 0.1%) — 20 parts by weight or 0.02 part by weight of dry dye
Solution of Rhodamine C in cyclohexane (concentration 0.2%) — 5 parts by weight or 0.01 part by weight of dry dye.

The film was produced by molding from a solution of the components in cyclohexane on a molding machine. The color changes of the film exposed to radiation of varying dose rates are similar to those of Example 8.

EXAMPLE 12

Cellulose triacetate (commercial film containing 10% dibutylphthalate and 0.5% calcium stearate), (Cellon) — 100 parts by weight
Solution of Malachite Green in an acetone-water mixture (in the volume ratio of 70 acetone to 30 water, concentration 0.1%) — 30 parts by weight or 0.03 part by weight of dry dye
mixed with 0.2% Rhodamine C solution in an acetone-water mixture (in the volume ratio of 70 acetone to 30 water)-, — 3.5 parts by weight or 0.007 part by weight of dry dye.

The impregnation procedure lasts for 3 to 5 minutes. The non-irradiated film is blue, turning violet at a radiation dose of $10^7$ rad, and red at a radiation dose of $3 \times 10^7$ rad.

EXAMPLE 13

The components in this example are those of Example 12 taken in the same weight ratios and in the same concentrations except that they are introduced into methylene chloride. The film is molded from a solution of the components. The non-irradiated film is blue, turning violet at a radiation dose of $10^7$, and red at a radiation dose of $3 \times 10^7$ rad.

What is claimed is:

1. A color indicator-dosimeter of ionizing radiation, comprising from 70 to 100 parts by weight of a thermoplastic polymer, from 10 to 40 parts by weight of a plasticizer, from 0.5 to 3.0 parts by weight of a stabilizer and two dyes compatible with said polymer, one of said dyes being incorporated in the color indicator-dosimeter to the extent of from 0.007 to 0.01 part by weight and having a G value of decolorization in said polymer of from 0.05 to 0.1 molecule/100 eV, with the absorption maximum thereof lying in the 450 to 590 nm spectral range, whereas the other of said two dyes is incorporated in the color indicator-dosimeter to the extent of from 0.015 to 0.03 part by weight and has a G value of decolorization in said polymer of from 0.15 to 1.5 molecule/100 eV, with the absorption maximum thereof lying in the 600 to 720 nm spectral range.

2. A color indicator-dosimeter of ionizing radiation as set forth in claim 1, wherein the dye having a G value of decolorization of from 0.05 to 0.1 molecule/100 eV and the absorption maximum lying in the 450 to 590 nm spectral range is selected from the group consisting of xanthene, polymethine and pyrazolone dyes.

3. A color indicator-dosimeter of ionizing radiation as set forth in claim 1, wherein the dye having a G value of decolorization of from 0.15 to 1.5 molecule/100 eV and the absorption maximum lying in the 600 to 720 nm spectral range is selected from the group consisting of triarylmethane, indigoid, thiazine, indophenol, indamine and indaniline dyes.

* * * * *